United States Patent
Islam et al.

(10) Patent No.: US 11,506,477 B2
(45) Date of Patent: Nov. 22, 2022

(54) SYSTEM AND METHOD FOR STABILIZATION OF MULTI-PATH OPTICAL INTERFEROMETERS

(71) Applicants: INSTITUT NATIONAL DE LA RECHERCHE SCIENTIFIQUE, Quebec (CA); The University Court of the University of Glasgow, Glasgow (GB)

(72) Inventors: Mehedi Islam, Montreal (CA); Piotr Roztocki, Longueuil (CA); Michael Kues, Lingen (DE); Christian Reimer, Brookline, MA (US); Bennet Fisher, Montreal (CA); Stefania Sciara, Montreal (CA); Robin Helsten, Montreal (CA); Yanbing Zhang, Montreal (CA); Yoann Jestin, Montreal (CA); Roberto Morandotti, Montreal (CA)

(73) Assignees: INSTITUT NATIONAL DE LA RECHERCHE SCIENTIFIQUE; THE UNIVERSITY COURT OF THE UNIVERSITY OF GLASGOW

( * ) Notice: Subject to any disclaimer, the term of this patent is extended or adjusted under 35 U.S.C. 154(b) by 0 days.

(21) Appl. No.: 17/008,070

(22) Filed: Aug. 31, 2020

(65) Prior Publication Data
US 2021/0063136 A1 Mar. 4, 2021

Related U.S. Application Data

(60) Provisional application No. 62/893,288, filed on Aug. 29, 2019.

(51) Int. Cl.
G01B 9/02015 (2022.01)
G01B 9/02001 (2022.01)

(52) U.S. Cl.
CPC ..... *G01B 9/02028* (2013.01); *G01B 9/02007* (2013.01); *G01B 2290/45* (2013.01); *G01B 2290/70* (2013.01)

(58) Field of Classification Search
CPC ............ G01B 9/02007; G01B 9/02027; G01B 9/02028; G01B 2290/45; G01B 2290/70
See application file for complete search history.

(56) References Cited

U.S. PATENT DOCUMENTS 4,444,501 A * 4/1984 Schwiesow ........ G01B 9/02002
356/452
5,396,328 A 3/1995 Jestel et al.
(Continued)

OTHER PUBLICATIONS

Z. Tian, S. S. Yam, and H. Loock, "Refractive index sensor based on an abrupt taper Michelson interferometer in a single-mode fiber," vol. 33, No. 10, pp. 1105-1107, 2008.
(Continued)

*Primary Examiner* — Michael A Lyons
(74) *Attorney, Agent, or Firm* — Lavery, De Billy, LLP; Gwendoline Bruneau (57) ABSTRACT

A system and a method for phase extraction of a multi-path interferometer, the method comprising generating a reference signal of a coherence length longer than an arm length difference of the multi-path interferometer; splitting the reference signal into a frequency shifted reference signal and an unshifted reference signal; recombining the frequency shifted reference signal and the unshifted reference signal into a polarization- and frequency-multiplexed reference signal, and feeding the polarization- and frequency-multiplexed reference signal to the multi-path interferometer; detecting frequency shifted and unshifted output signals of the multi-path interferometer; and determining the interferometer phase from the detected signal.

14 Claims, 5 Drawing Sheets

(56) References Cited

U.S. PATENT DOCUMENTS

| | | | | |
|---|---|---|---|---|
| 5,784,161 | A | * | 7/1998 | Bechstein .............. G01J 9/04 356/487 |
| 6,175,320 | B1 | * | 1/2001 | Heflinger .............. G02F 7/00 341/131 |
| 7,019,838 | B2 | | 3/2006 | Izatt et al. |
| 7,508,523 | B2 | | 3/2009 | Chang et al. |
| 7,619,719 | B2 | | 11/2009 | Rohner et al. |
| 7,903,256 | B2 | | 3/2011 | Sarunic et al. |
| 10,578,421 | B2 | | 3/2020 | Roztocki et al. |
| 2017/0038192 | A1 | * | 2/2017 | Chen .................. G01S 17/36 |
| 2018/0180401 | A1 | * | 6/2018 | Roztocki .............. G01J 3/45 |

OTHER PUBLICATIONS

A. Klenke et al., "Coherently combined 16-channel multicore fiber laser system," Opt. Lett., vol. 43, No. 7, p. 1519, Apr. 2018.

G. Observatory, "LIGO: The Laser Interferometer", May 19, 2009.

R. T. Thew, A. Acin, H. Zbinden, and N. Gisin, "Experimental realization of entangled qutrits for quantum communication," 2003.

C. Reimer et al., "Generation of multiphoton entangled quantum states by means of integrated frequency combs," Science (80-. )., vol. 351, No. 6278, pp. 1176-1180, 2016.

R. Ramchander, "Quadrature-point stabilization of Mach-Zehnder interferometers," Thesis, 1990.

D. A. Jackson, R. Priest, A. Dandridge, A. B. Tveten, and B. A. Tveten, "Elimination of drift in a single-mode optical fiber interferometer using a piezoelctrically streched coiled fiber," Appl. Opt., vol. 19, No. 17, pp. 2926-2929, Sep. 1980.

K. P. Koo, A. B. Tveten, and A. Dandridge, "Passive stabilization scheme for fiber interferometers using (3x3) fiber directional couplers," Appl. Phys. Lett., vol. 41, No. 7, pp. 616-618, 1982.

S.-B. Cho and T.-G. Noh, "Stabilization of a long-armed fiber-optic single-photon interferometer," Opt. Express, vol. 17, No. 21, p. 19027, Oct. 2009.

G. Weihs, M. Reck, H. Weinfurter, and A. Zeilinger "All-fiber three-path Mach-Zehnder interferometer.," Opt. Lett., vol. 21, No. 4, pp. 302-304, 1996.

Z. Zhao et al., "All-solid multi-core fiber-based multipath Mach-Zehnder interferometer for temperature sensing," Appl. Phys. B Lasers Opt., vol. 112, No. 4, pp. 491-497, 2013.

P. Hariharan and D. Sen, "Three-beam interferometer," vol. 70, pp. 2-5, 1959.

N. Spagnolo et al., "Quantum interferometry with three-dimensional geometry," pp. 1-6, 2012.

K. Liu and R. M. Measures, "Signal Processing Techniques for Interferometric Fiber-Optic Strain Sensors," vol. 3, No. Jul., pp. 432-461, 2008.

A. Dandridge, A. B. Tveten, and T. G. Giallorenzi, "Homodyne Demodulation Scheme for Fiber Optic Sensors Using Phase Generated Carrier," IEEE Trans. Microw. Theory Tech., vol. 30, No. 10, pp. 1635-1641, Oct. 1982.

V. S. Sudarshanam and K. Srinivasan, "Linear readout of dynamic phase change in a fiber-optic homodyne interferometer," 1989.

Yu-Lung Lo and Chin-Ho Chuang, "New synthetic-heterodyne demodulator for an optical fiber interferometer," IEEE J. Quantum Electron., vol. 37, No. 5, pp. 658-663, May 2001.

M. A. Choma, C. Yang, and J. A. Izatt, "Instantaneous quadrature low-coherence interferometry with 3x3 fiber-optic couplers," Opt. Lett., vol. 28, No. 22, p. 2162, Nov. 2003.

R. Dändliker, R. Thalmann, and D. Prongué, "Two-wavelength laser interferometry using superheterodyne detection," Opt. Lett., vol. 13, No. 5, p. 339, 1988.

D. H. Kim and B. J. Ahn, "Phase measurement and error analysis in the arc-tangent method using a novel phase-compensating algorithm," Meas. Sci. Technol., vol. 24, No. 10, 2013.

T. Ikuta and H. Takesue, "Implementation of quantum state tomography for time-bin qudits," New J. Phys., vol. 19, No. 1, p. 013039, Jan. 2017.

M. Z-Dotukowski, A. Zeilinger, and M. A. Horne, "Realizable higher-dimensional two-particle entanglements via multiport beam splitters," Phys. Rev. A, vol. 55, No. 4, pp. 2564-2579, Apr. 1997.

* cited by examiner

SYSTEM AND METHOD FOR STABILIZATION OF MULTI-PATH OPTICAL INTERFEROMETERS

CROSS REFERENCE TO RELATED APPLICATIONS

This application claims benefit of U.S. provisional application Ser. No. 62/893,288 filed on Aug. 29, 2019. All documents above are incorporated herein in their entirety by reference.

FIELD OF THE INVENTION

The present invention relates to interferometers. More specifically, it is concerned with a system and a method for phase-readout/control and active stabilization on arbitrary interferometric phase of multi-path optical interferometers.

BACKGROUND OF THE INVENTION

Interferometers are widely-used instruments that are based on the interference between two or more optical waves. Interferometry is central in many fields such as optical sensing, microscopy, including for example optical coherence tomography (OCT), imaging, astrophysics, nonlinear and quantum optics, with the majority of applications requiring a precise determination of the relative phase between two or more optical fields. Such phase information can enable to stabilize the relative length of the interferometer paths, as well as to reconstruct the optical fields which are injected into an interferometer. For example, phase information can be used for coherent detection, or for measuring environmental variables such as refractive index changes, temperature, material stress and strain. However, the precise and unambiguous determination of relative interferometric phases is challenging.

While extensive efforts have been carried out towards investigating two-path interferometric phase recovery, the two-path interferometers developed today demonstrate low phase sensitivity compared to multipath counterparts. This low phase sensitivity is an issue in optical metrology applications, and for the precise control and stabilization on arbitrary phases. The number of waves that can interfere scales with the number (N) of paths; in the case of two paths (N=2), which limits the potential scope for applications that require higher dimensional signal-mixing, such as time-bin-based quantum information encoding.

Multi-path (N>2) interferometers offer higher phase sensitivity for both classical and quantum applications, as well as enable the high-resolution determination of interferometric phases. Moreover, when considering the temporal domain, multi-path interferometers offer access to manipulate larger time-bin-based quantum resources, which is a key for the realization and then the boost of quantum technologies and dense communications methods. While multi-path interferometers have been demonstrated for various applications in sensing/imaging, nonlinear, integrated and quantum optics, the state-of-the-art still lacks however accurate readout methods for determining relative path phases. In particular, fast, precise, and unambiguous methods for phase extraction are not available, which is a necessary condition for interferometric phase stabilization. Moreover, the increased sensitivity of such interferometers to noise [16] makes these tasks even more challenging.

In the case of two-path interferometers, the issue of phase extraction has been addressed through homodyne and heterodyne phase detection methods. Typically, in the homodyne-based approach, the light source consists of a highly stable single frequency laser which maintains the same frequency between the interfering waves. In the heterodyne-based approach, the interfering waves have different frequencies, and their relative phase difference is extracted from intensity variations of the interferometric output. Some recent progress using heterodyne and homodyne detection methods for two-path interferometric phase extraction has been reported. In the heterodyne-based approach, one of the heterodyne signals, for example of a given frequency, was used as reference signal, phase extraction was achieved by measuring the reference, while interferometric signal intensity through appropriate usage of wavelength division multiplexers. In the homodyne-based approach, a polarization-multiplexed, bi-color laser method was used for both extraction and stabilization of the interferometric phase.

Several application-specific approaches for multi-path interferometers have been also reported, including, for example, integrated and laser-written three- and four-path interferometers, all fiber three-path, and complex free-space multi-path interferometers. Presented methods for the instantaneous phase extraction involve highly intricate algorithms with deconvolutions; moreover, their validity may be valid only for quadrature detection leading to more complex setups to ensure the quadrature condition. Such condition approximates that the interferometric output intensity changes linearly with a relative phase change. Most importantly, all the reported approaches still show phase ambiguity. Furthermore, they are very application-specific thus potentially limiting detection speed as well as hampering a broader range of applications.

Multi-path approaches demonstrated thus far are strictly limited to specific applications, and additionally make use of setups working only in transmission. This potentially increases losses, as well as demands rigid reproducibility over splitting ratios, thus limiting applications, or are based on complex and bulky methods. Among a few reported methods providing an explicit methodology to extract the relative phases for each interferometer path using intricate algorithms, none allows setting arbitrary phases, which has never been addressed in previous approaches for interferometers with than two paths (with N>2 paths). Moreover, most of the phase readout methods, such as, for example, the so-called 'arc-tangent method', for two- and three-path interferometers suffer from the phase ambiguity issue. This means that, due to the symmetry of the cos-function used for the phase readout, the sign of the calculated phase remains unclear. Furthermore, the phase readout for two-path interferometers is based on the assumption of employing two initial sinusoidal waves with an exact phase difference of 90° (or $\pi/2$ rad). This allows in turn the mathematical extraction of the phase by using the inverse of the tangent. For this reason, the arc-tangent method requires extra effort in order to establish the exact initial phase offset (i.e. 90°) for a precise phase unwrapping. Lastly, while the concatenation of two-path interferometers can allow for the coherent mixing of more than two waves, such an approach is not scalable for all applications, due to high optical losses for example. Moreover, since the intensity equations for multiple-path interferometers are multivariable transcendental equations, they are functions of multiple phases, and the arc-tangent method is not viable to extract the interferometer phase when it consists of more than two-paths.

Thus, there is a need in the art for a system and method for phase-readout of multi-path optical interferometers.

SUMMARY OF THE INVENTION

More specifically, in accordance with the present invention, there is provided a method for phase extraction of a multi-path interferometer, comprising generating a reference signal of a coherence length longer than an arm length difference of the multi-path interferometer; splitting the reference signal into a frequency shifted reference signal and an unshifted reference signal; recombining the frequency shifted reference signal and the unshifted reference signal into a polarization- and frequency-multiplexed reference signal, and feeding the polarization- and frequency-multiplexed reference signal to the multi-path interferometer; detecting frequency shifted and unshifted output signals of the multi-path interferometer; and determining the interferometer phase from the detected signals.

There is further provided a system for phase extraction of a multi-path interferometer, of a number N of paths greater than 2, comprising a light source, the light source generating a coherence length longer than an arm length difference of the multi-path interferometer; a polarization multiplexing unit connected to the multi-path interferometer; a detection unit; and a signal processing unit at the output of the multi-path interferometer; wherein the polarization multiplexing unit splits a reference signal generated by the light source into a frequency shifted reference signal and an unshifted reference signal, recombines the frequency shifted reference signal and the unshifted reference signal into a polarization- and frequency-multiplexed reference signal, and feeds the polarization- and frequency-multiplexed reference signal to the multi-path interferometer; the detection unit detecting frequency-shifted and unshifted output signals of the multi-path interferometer; and the signal processing unit determines the interferometer phase from the signals detected by the detection unit.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

Figure 1A:
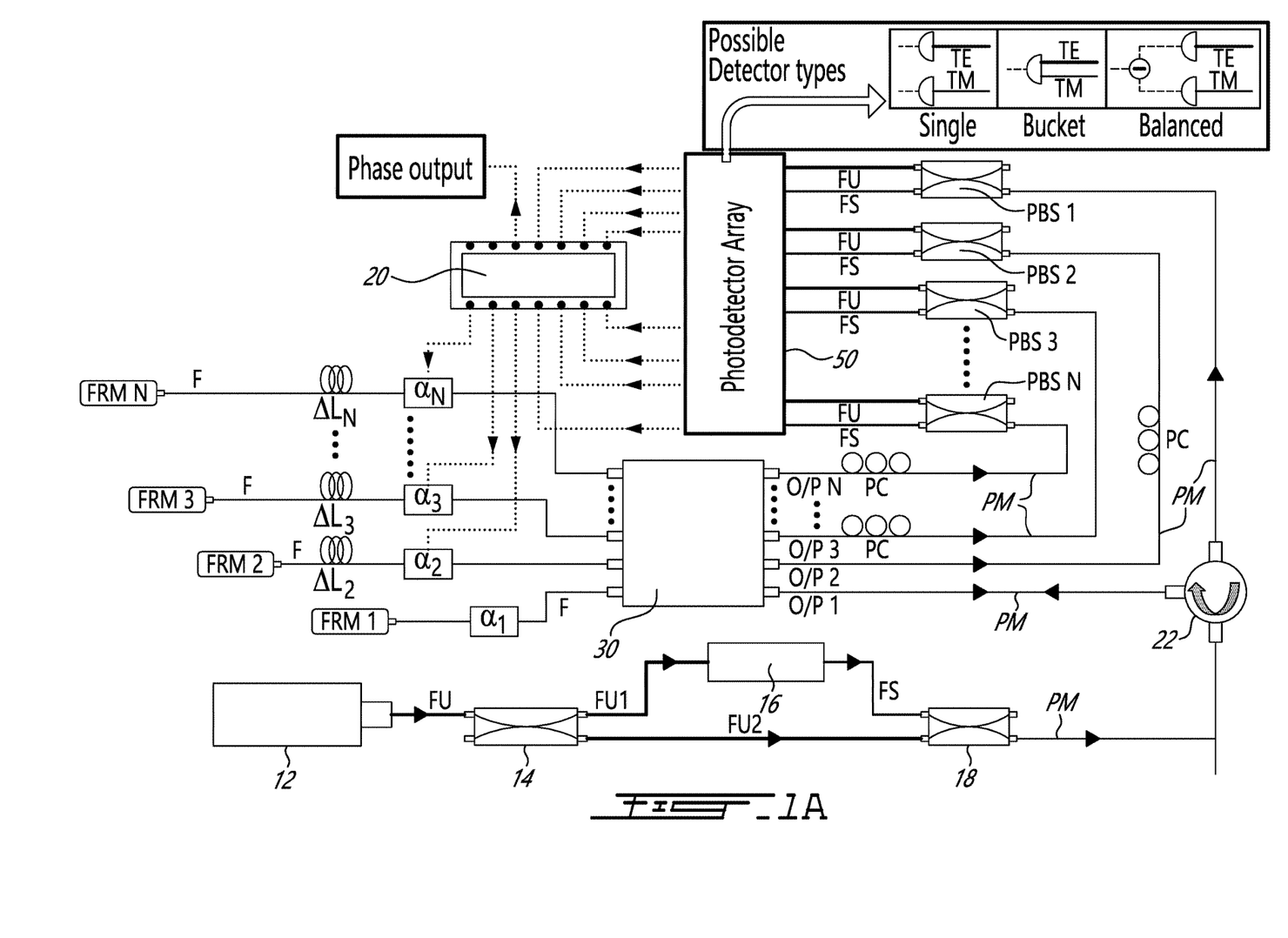
FIG. 1A is a schematic of a system according to an embodiment of an aspect of the present invention.
Figure 1B:
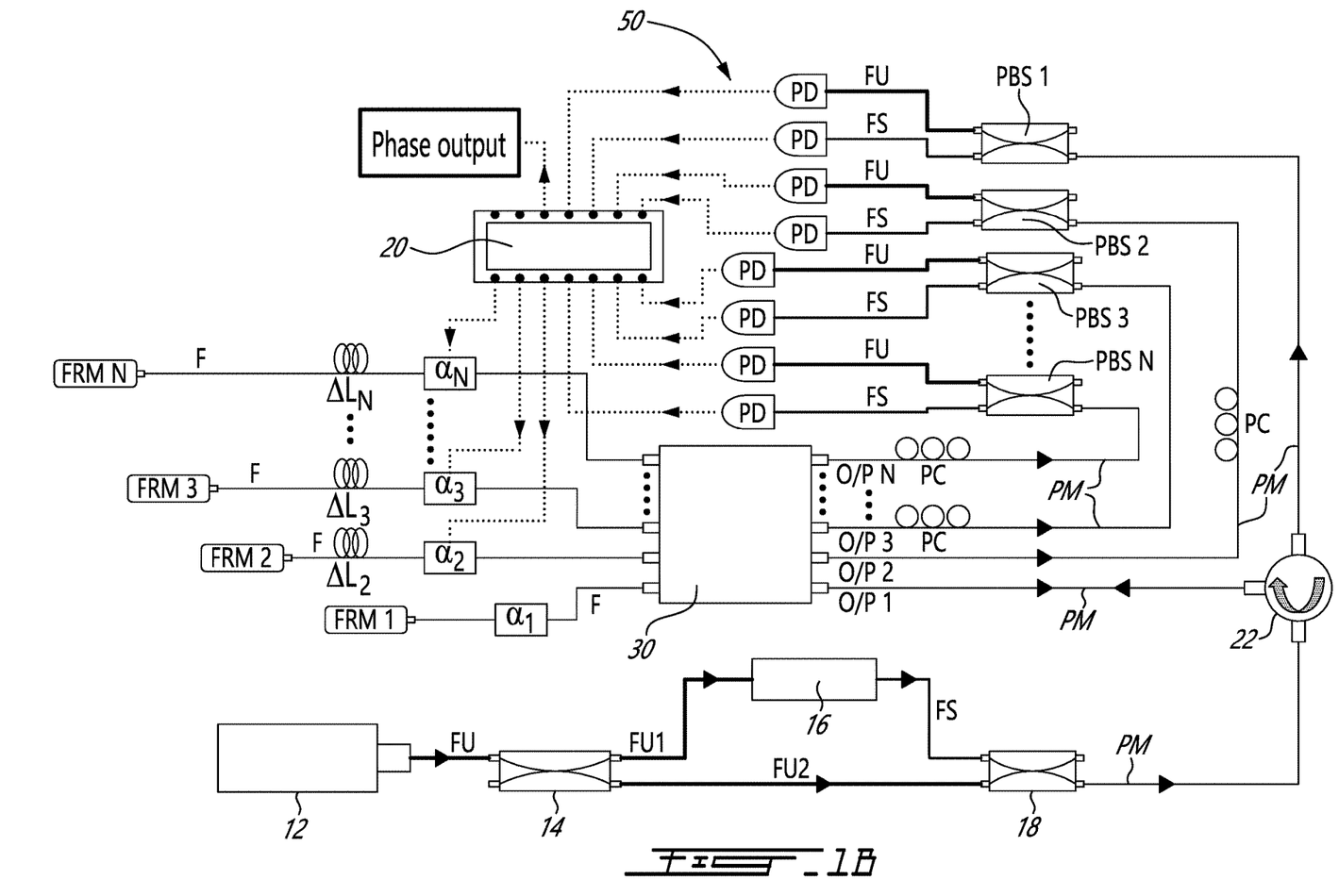
FIG. 1B is a schematic of a system according to an embodiment of an aspect of the present invention.

A schematic of a system according to an embodiment of an aspect of the present invention is shown in FIG. 1, FS, FU, PM, and F lines represent frequency-shifted, -unshifted signals, polarization-maintaining fibers, and arbitrary optical fibers, respectively. Dashed lines represent transmission of electrical signals.

The system comprises a reference light source 12, a polarization multiplexing unit connected to a multi-path interferometer, a detection unit 50, and a signal processing unit 20 at the output of the multi-path interferometer.

The light source 12 is selected as a light source generating a coherence length longer than the interferometer arm length difference. It may be a continuous wave (CW) laser, such as a narrowband continuous wave (CW) laser for example, or of pulsed output. Alternative light sources such as diodes, gas and solid state lasers, as well as lasers generating bi-color beams, such as simple NdYAG frequency doubled green lasers that produce a frequency and its harmonic, for creating two-color beams, may be used. The polarization multiplexing unit illustrated in FIG. 1 comprises a beam splitter/coupler 14 that splits the pulsed or continuous wave output FU of the reference coherent light source 12 into two spatial modes FU1, FU, a frequency shifter 16 for frequency conversion of a first mode FU1 into a frequency shifted reference signal FS; a polarization beam splitter (PBS) 18 and a polarization-maintaining (PM) optical fiber recombine both spatial modes, namely the frequency shifted reference signal FS and the unshifted reference signal FU2, with both spatial modes aligned to different fiber axis, namely frequency-shifted FS and unshifted signals FU to slow and fast axis, respectively, or vice versa. Alternatively, standard polarization-maintaining fibres may be replaced with polarization control components such as mechanical polarization controllers.

The frequency shifter 16 may be an acousto-optic modulator or an electro-optic modulator, effects for example.

The resulting polarization- and frequency-multiplexed reference laser signal is then injected into the multi-path interferometer by an optical circulator 22.

In the example case of N-path interferometers illustrated in FIG. 1, the multi-path interferometer is an unbalanced N-path Michelson fiber interferometer composed of a standard N×N fiber coupler and Faraday rotator mirrors (FRM), with respective corresponding path phases α_(1 . . . N), and respective relative length differences between the reference path and the corresponding interferometer paths ΔL_(2 . . . N).

Other interferometer configuration may be used, such as for example Mach Zehnder interferometers.

The system and method can be applied to balanced interferometers, in which the path phases α_(1 . . . N) and respective relative length difference between the reference path and the corresponding interferometer path ΔL_(2 . . . N) are kept constant from potential observed deviations, may also be used.

At the output of the multi-path interferometer, the signals O/P 1, O/P 2, . . . , O/P N are extracted/demultiplexed into as many frequency-shifted FS and -unshifted FU signals using optional optical filtering, and polarization beam-splitters PBS1, PBS2, PBS_N, prior to detection by the detection unit 50, and electronically fed into the signal processing unit 20 for phase computation.

In the embodiment illustrated in FIG. 1, the detection unit 50 is an array of photodiodes. The detecting unit may comprise a polarization demultiplexer and a detector for each one of the TE and TM signals, as illustrated for example in FIG. 1B; or bucket detectors that detect TE and TM together (TE+TM); or balanced detectors that measures TE-TM, or any combination thereof (see insert FIG. 1A).

The signal processing unit 20 determines the interferometer phase from the signals detected by the detection unit 50. The signal processing unit 20 may then compare the determined interferometer phase to a target phase and deliver output signals for phase rectification (see Phase output in FIG. 1), for example to stabilize the relative path phases via electronically-adjustable in-path phase shifters. Real time filters, analog and digital, may be used to eliminate electrical and sampling noise. The signal processing unit 20 may also track the interferometer phase for example for sensing applications.

In the case of two-path fiber interferometers, phases can be calculated by using the arc-tangent method. Since multi-path interference governing intensity relations are functions of multiple phases, the arc-tangent method cannot be used to extract the interferometer phase when more than two-paths are involved (see multivariable relations (1) below). A method according to an embodiment of an aspect of the present disclosure comprises determining the instantaneous phases of the multi-path optical interferometer.

Figure 2:
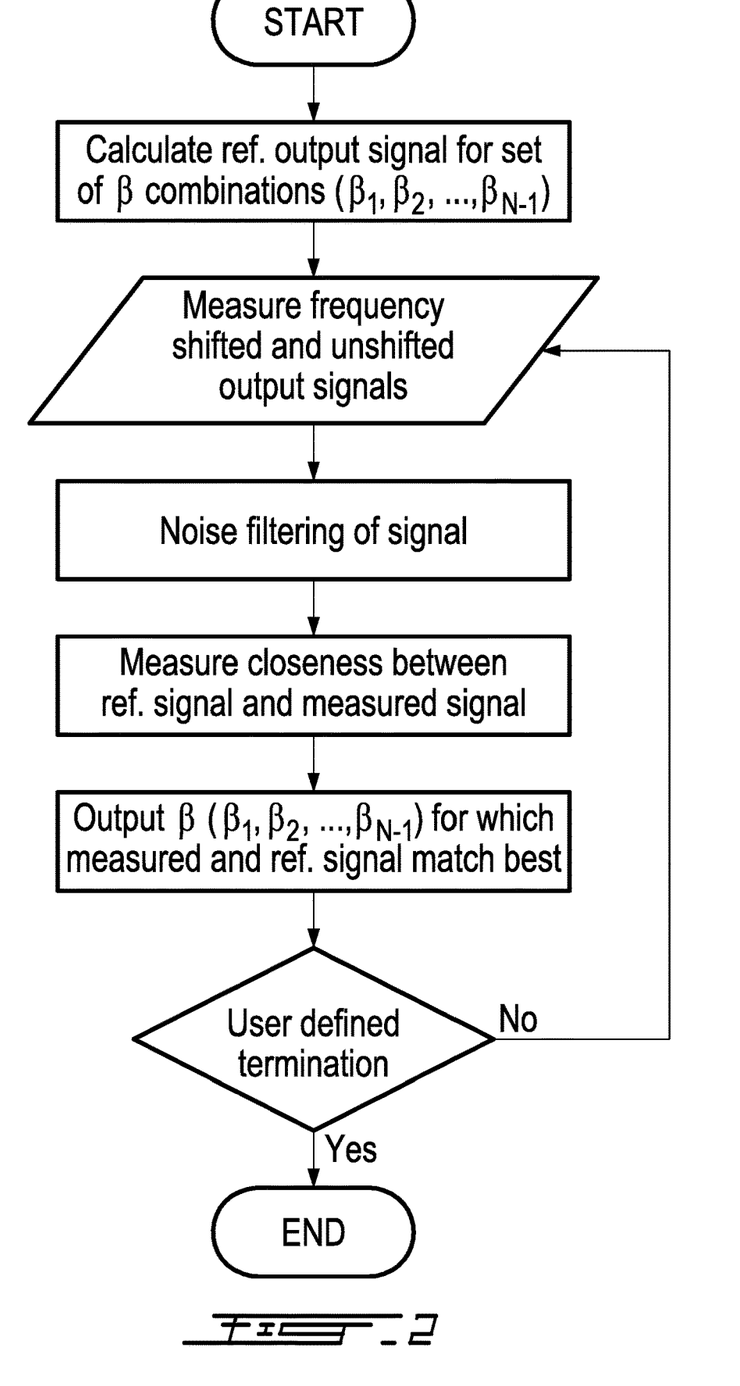
FIG. 2 is a flow chart of a phase extraction method used for the phase extraction in a multi-path interferometer according to an embodiment of an aspect of the present invention.

FIG. 2 is a flowchart of a phase extraction method according to an embodiment of an aspect of the present disclosure. The method comprises determining frequency-shifted and unshifted interferometer outputs to use as interferometer output reference intensities, for example by using the N-path interferometric coupler equations as known in the art for a set of a grid of phase combinations of $\beta_1$, $\beta_2$, . . . , $\beta_{N-1}$. Then, detected frequency shifted and unshifted interferometric output signals are compared with these frequency shifted and unshifted interferometer output reference intensities, and the intensities with the highest proximity, or interpolated values, are identified as the correct solutions for $\beta_1$, $\beta_2$, . . . , $\beta_{N-1}$.

The present method for phase-readout of multi-path optical interferometers allows the phase to be extracted without nonlinearities or increased errors in phase extraction, also in the case in which the quadrature condition is not satisfied (FIG. 4) when the interferometric output does not change linearly with the relative phase change.

Implementation of the system and method was carried out in two specific cases of a three-(N=3) and a two-(N=2) path interferometers. In each case, the relative phase differences were extracted with less than 1.5% average error.

In the three-path interferometry case, the unbalanced interferometer comprised a fiber-optic tritter (3×3 fiber coupler), and paths of length L, 2L, and 3L respectively, where L represents the reference path length. For such a three-path interferometer, a $(2n+1)\pi/3$ phase shift between the frequency shifted and unshifted reference laser signal, created for example by an optical modulator driven by MHz sinusoidal RF signals, was used to create the optimal phase shift between the frequency shifted and unshifted interferometric output signal. Thus the quadrature condition was fulfilled, and a maximum fringe visibility was obtained. For this three-path interferometer case, the frequency shifted and unshifted interfered signal from interferometer output port 1 (O/P 1) and 2 (O/P 2) were split using polarization beam splitter PBS 1 and polarization beam splitter PBS 2, respectively. A polarization controller (PC) was used in between 0/P 2 and polarization beam splitter PBS 2 to minimize the power transfer by the polarization crosstalk between the frequency shifted and unshifted signal. Four photodetectors (PDs) corresponding to interferometric output O/P 1 and output O/P 2 were used to measure the frequency shifted and unshifted interfered signals (see FIG. 1B). The frequency shifted and unshifted interference signals from interferometer outputs O/P 1 and O/P 2 are given by:

$$I_{1,unshifted} = \frac{I_0}{9}[t_1^2 + t_2^2 + t_3^2 + 2t_1t_2\cos(\beta_1) + 2t_2t_3\cos(\beta_2) + 2t_3t_1\cos(\beta_1 + \beta_2)] \quad (1)$$

$$I_{1,shifted} = \frac{I_0}{9}\left[t_1^2 + t_2^2 + t_3^2 + 2t_1t_2\cos\left(\beta_1 - \frac{\pi}{3}\right) + 2t_2t_3\cos\left(\beta_2 - \frac{2\pi}{3}\right) + 2t_3t_1\cos(\beta_1 + \beta_2 - \pi)\right]$$

$$I_{2,unshifted} = \frac{I_0}{9}\left[t_1^2 + t_2^2 + t_3^2 + 2t_1t_2\cos\left(\beta_1 - \frac{2\pi}{3}\right) + 2t_2t_3\cos\left(\beta_2 + \frac{4\pi}{3}\right) + 2t_3t_1\cos\left(\beta_1 + \beta_2 + \frac{2\pi}{3}\right)\right]$$

$$I_{2,shifted} = \frac{I_0}{9}\left[t_1^2 + t_2^2 + t_3^2 + 2t_1t_2\cos\left(\beta_1 - \frac{2\pi}{3} - \frac{\pi}{3}\right) + 2t_2t_3\cos\left(\beta_2 + \frac{4\pi}{3} - \frac{2\pi}{3}\right) + 2t_3t_1\cos\left(\beta_1 + \beta_2 + \frac{2\pi}{3} - \pi\right)\right]$$

where $I_{1,shifted/unshifted}$ and $I_{2,shifted/unshifted}$ are the intensities corresponding to the frequency shifted and unshifted interfered signals from interferometer outputs O/P 1 and O/P 2 respectively, $I_0$ is the maximum measured power set by the light 12, $t_1$, $t_2$, $t_3$ are the transmission coefficients of each path pre-determined by coupling ratio of the coupler, $\beta_1 = \alpha_2 - \alpha_1$ and $\beta_2 = \alpha_3 - \beta_2$ are the relative phase differences that can be controlled through the phase shifting elements attached to the middle and long paths of the interferometer, respectively.

Then, the experimental interfered frequency shifted and unshifted output intensities were measured at both output ports, at O/P 1 and O/P 2 of the interferometer, using four different photodiodes PD (FIG. 1). These photodiode output signals were acquired by using analog to digital converters (ADCs), either built into the signal processing unit or external to it (not shown).

Using a third polarization beam splitter PBS 3 and a total of 6 photodiodes PD, the accuracy of the readout can be further improved for the three-path case.

FIG. 3 show the simulated frequency shifted and unshifted interferometric outputs as a function of $\beta_1$ and $\beta_2$, where $\beta_1$ and $\beta_2$ are swept linearly at the same rate between 0 to $2\pi$. FIG. 3A shows interferometric output signals, as a function of $\beta_1$ and $\beta_2$, detected at photodetectors, where $\beta_1$ and $\beta_2$ has been swept linearly between 0 to 27. When a phase offset of $$(2n+1)\frac{\pi}{3}$$

is introduced between frequency shifted and unshifted reference laser light by an optical modulator, the relative phases between the paths of the interferometer as detected by the photodiodes are in quadrature.

Figure 3A:
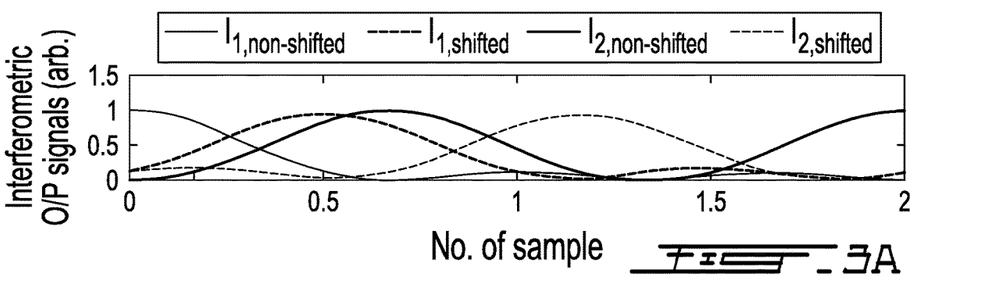
FIG. 3A shows interferometric output signals, as a function given and extracted phases of $\beta_1$, and $\beta_2$, detected at photodetectors, where $\beta_1$ and $\beta_2$ are swept linearly between 0 to $2\pi$; the relative phases of the detected photodiode signals are in quadrature.
Figure 3B:
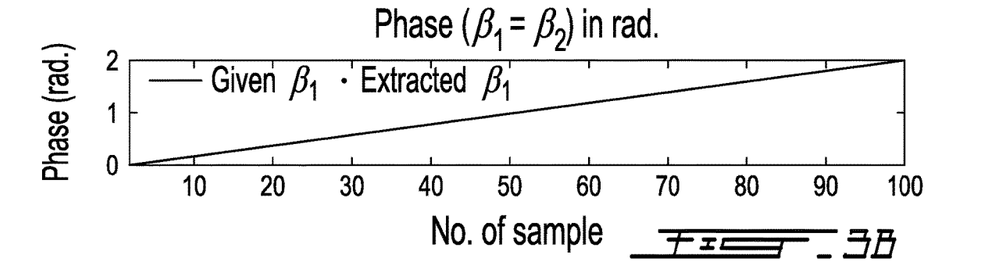
FIG. 3B shows given and extracted phases $\beta_1$ and $\beta_2$.
Figure 3C:
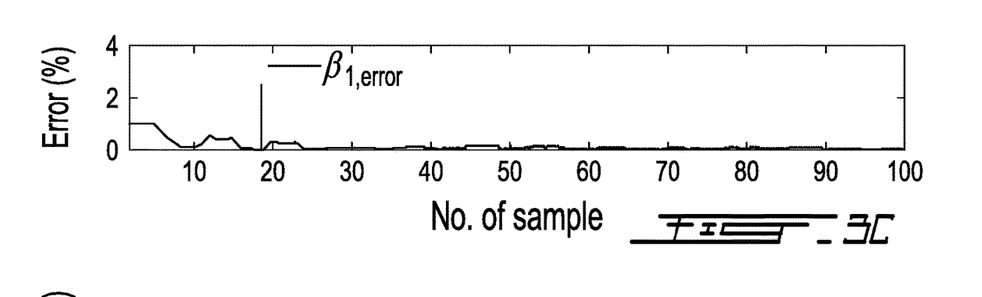
FIG. 3C shows the error between the given phase $\beta_1$, for which the interferometric output signals are generated, and the extracted phase calculated based on the photodiode signals.
Figure 3D:
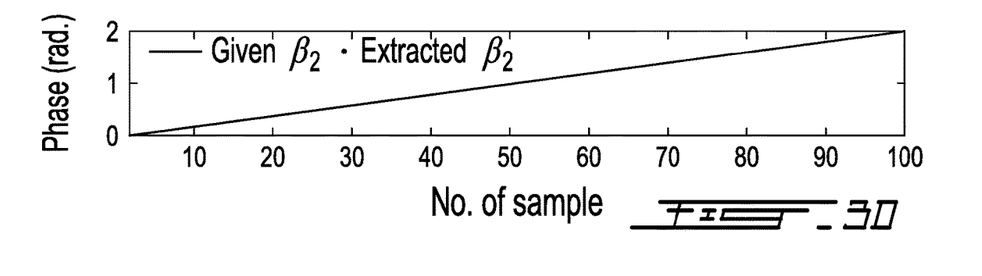
FIG. 3D shows given and extracted phases $\beta_2$.
Figure 3E:
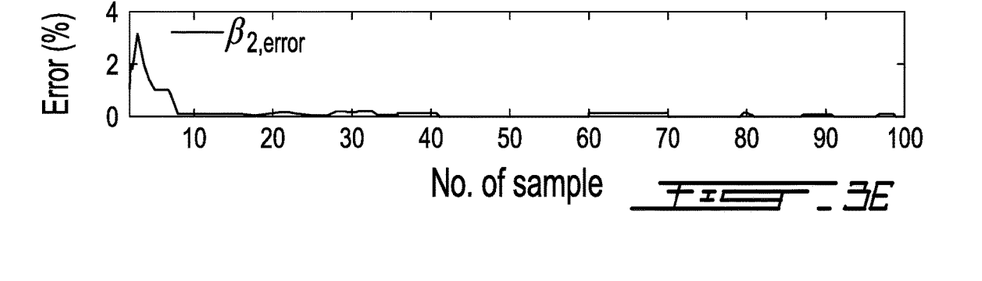
FIG. 3E shows the error between the given phase $\beta_2$, for which the interferometric output signals are generated, and the extracted phase calculated based on the photodiode signals.

FIG. 3B shows given and extracted phases $\beta_1$ and $\beta_2$; FIG. 3C shows the error between the given phase $\beta_1$, for which the interferometric output signals are generated, and the extracted phase calculated based on the photodiode signals; FIG. 3D shows given and extracted phases $\beta_2$; and FIG. 3E shows the error between the given phase $\beta_2$, for which the interferometric output signals are generated, and the extracted phase calculated based on the photodiode signals.

Figure 4A:
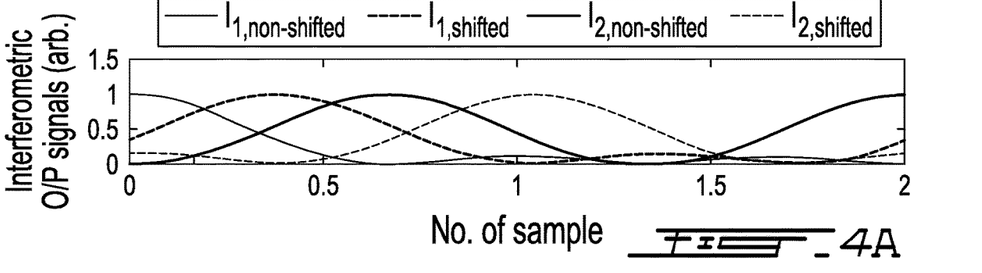
FIG. 4A shows interferometric output signals, as a function of and r detected at photodetectors where $\beta_1$ and $\beta_2$ are swept linearly between 0 to $2\pi$; the relative phases of the detected photodiode signals being out of quadrature.

Otherwise, the relative interferometric phase deviates from the quadrature condition, as shown in FIG. 4A, where the reference laser signal through the optical modulator was shifted by $$(2n+1)\frac{\pi}{4}.$$

To runner investigate the phase extraction/recovery method, the algorithm was tested rigorously for different combinations of $\beta_1$ and $\beta_2$ phase sweeps leading to an average error of less than 1.5%.

Figure 4B:
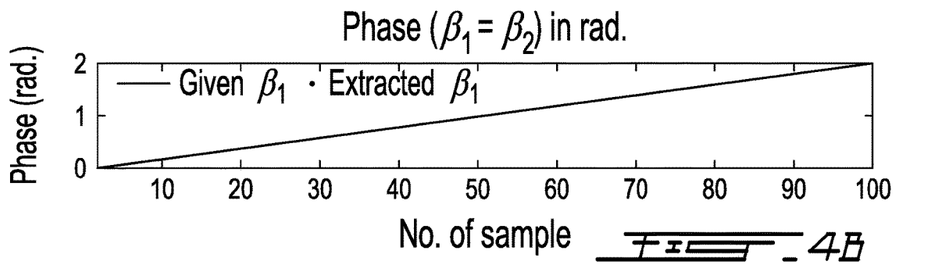
FIG. 4B shows given and extracted phases $\beta_1$ and $\beta_2$.
Figure 4C:
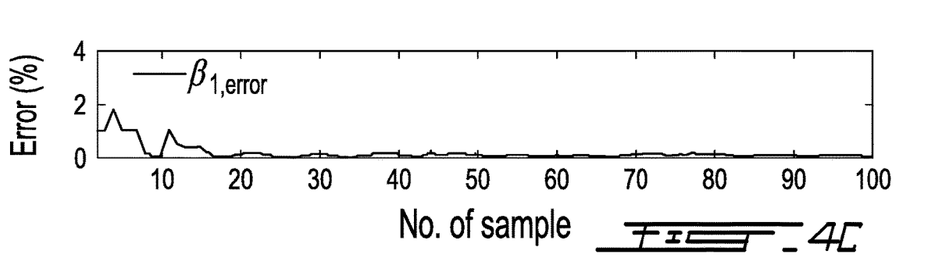
FIG. 4C shows the error between the given phase $\beta_1$, for which the interferometric output signals are generated, and the extracted phase calculated based on the photodiode signals.
Figure 4D:
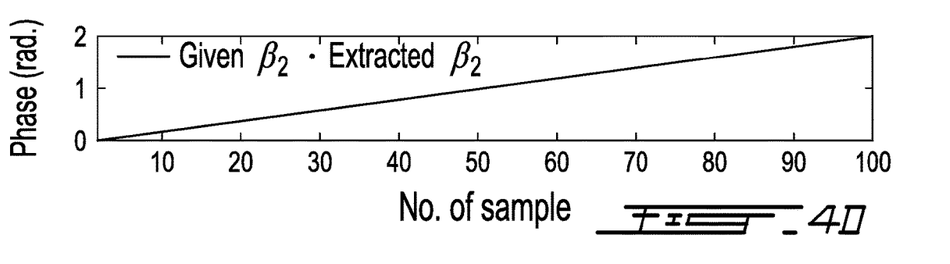
FIG. 4D shows given and extracted phases $\beta_2$.
Figure 4E:
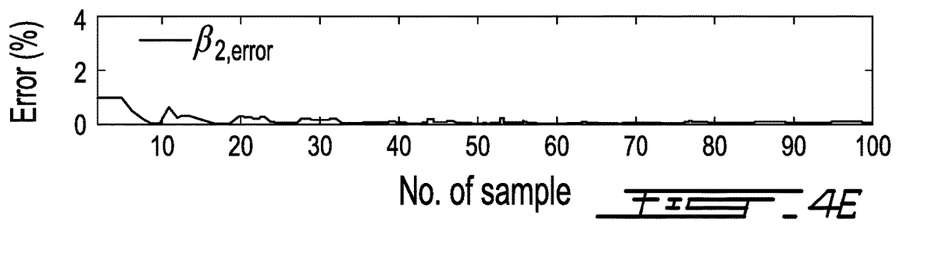
FIG. 4E shows the error between the given phase $\beta_2$, for which the interferometric output signals are generated, and the extracted phase calculated based on the photodiode signals.

FIG. 4B shows given and extracted phases $\beta_1$ and $\beta_2$; FIG. 4C shows the error between the given phase $\beta_1$, for which the interferometric output signals are generated, and the extracted phase calculated based on the photodiode signals; FIG. 4D shows given and extracted phases $\beta_2$; and FIG. 4E shows the error between the given phase $\beta_2$, for which the interferometric output signals are generated, and the extracted phase calculated based on the photodiode signals.

To test the method for two-path interferometric phase extraction, the N×N coupler was replaced by a 2×2 coupler and the interferometric output intensity equations adjusted accordingly. In this case, the acousto-optic modulator (AOM) was modulated with a MHZ sinusoidal RF signal in such a way that it induces a phase offset of $$(2n+1)\frac{\pi}{2}$$

between the frequency shifted and unshifted reference laser signals. This in turn enables fulfilling the quadrature condition of the relative phases of the two-path interferometer, as well as a maximized fringe visibility.

In this case, the frequency shifted and unshifted interfered signals are available from the output O/P 1 using only two photodiodes (PD), which are enough to extract the interferometric phase information using the phase extraction method described hereinabove, with an average error <1%. The phase was thus extracted with high accuracy, with an average error <1.5%, when the phase offset between reference frequency shifted and unshifted interference signals is unequal to $(2n+1)\pi/2$, thus not fulfilling quadrature condition, in contrast to state-of-the-art arc-tangent method.

A method and a system for phase extraction in multi-path interferometers are thus provided.

Although the examples illustrated herein contemplated an unbalanced N-path Michelson fiber interferometer, the system and method apply with other interferometer configuration, such as for example Mach Zehnder interferometers, as well as balanced interferometers, in which the path phases $\alpha_{-}(1 \ldots N)$ and respective relative length difference between the reference path and the corresponding interferometer path $\Delta L_{-}(2 \ldots N)$ are kept constant from potential observed deviations.

The system for stabilizing a multi-arm interferometer comprises a single reference coherent light source, a coupler to split a single output from the source into a frequency shifted reference signal and the unshifted reference signal and a polarization multiplexing unit feeding the multi-arm interferometer, and a detecting unit of the frequency shifted and unshifted interferometer outputs.

As opposed to increasing the number of reference signals, for example either using 3, 4, 5, etc lasers or to generate multiple frequency shifted copies, which increases complexity significantly and does not allow polarization multiplexing, the present method and system comprise using the same input as in a case of two-arm interferometers, and splitting the input into a frequency shifted part and a polarization multiplexed part, for stabilization of multi-arm interferometers: Using the same input for two-arm and multi-arm interferometers, a usable signal for stabilization is extracted from the frequency shifted and unshifted interferometer outputs as measured by a detecting unit.

The disclosed system and polarization-multiplexing unit can be implemented with single frequency or broadband light for applications in Fourier-transform spectroscopy, sensing applications such as optical coherence tomography (OCT) for example, signal recombination, coherent detection in optical transponders, quantum signal processing and communications for example.

Since the method for phase extraction from measured signals is not based on the arc-tangent method, the present method may map the extracted phase automatically and instantaneously between 0 to $2\pi$, thus overcoming the need of phase unwrapping. Moreover, the method does not require additional steps, such as tracking the derivatives of interferometric intensity to remove the phase ambiguity for example. This, in turn, makes the phase extraction substantially faster than state-of-the-art methods. Finally, this extraction method can be implemented using electronic circuits such as microcontroller, field-programmable gate array (FPGA), Application Specific Integrated Circuit (ASIC) etc. and the electronic circuits can be used as a standalone phase meter for multi-path fiber interferometer.

A phase extraction method and system to determine the relative phase differences among the paths of an N-path interferometer are thus provided. The method does not cause phase ambiguity. Furthermore, since it does not require tracking of the interference intensity, such as for example derivative measurements, the method results are instantaneous, and yields a mapping of the phase directly between 0 to $2\pi$, in such a way that phase unwrapping is unnecessary. There is thus provided a fast and robust method for determining the phases of N-path interferometers. Moreover, this method is scalable for N≥2 path-interferometers and provides an extraction speed-up, with same accuracy as that for N=2-path systems.

The scope of the claims should not be limited by the embodiments set forth in the examples, but should be given the broadest interpretation consistent with the description as a whole.

REFERENCES

Z. Tian, S. S. Yam, and H. Loock, "Refractive index sensor based on an abrupt taper Michelson interferometer in a single-mode fiber," vol. 33, no. 10, pp. 1105-1107, 2008.

J. A. Izzat, M. Choma, and C. Yang, "U.S. Pat. No. 7,019,838 B2," 2006.

M. V. Sarunic and J. A. Applegate, Brian E. Izatt, "US 2008/0170219 A1," 2008.

S. Chang, C. P. Flueraru, and S. S. Sherif, "US 2008/0198367 A1," 19 Jul. 2008.

M. Rohner and T. Jensen, "U.S. Pat. No. 7,619,719 B2," 9 Feb. 2006.

A. Klenke et al., "Coherently combined 16-channel multicore fiber laser system," Opt. Lett., vol. 43, no. 7, p. 1519, April 2018.

G. Observatory, "LIGO: The Laser Interferometer."

D. Jestel, A. Franz, and D. Michel, "U.S. Pat. No. 5,396,328A," 8 Feb. 1991.

R. T. Thew, A. Acin, H. Zbinden, and N. Gisin, "Experimental realization of entangled qutrits for quantum communication," 2003.

C. Reimer et al., "Generation of multiphoton entangled quantum states by means of integrated frequency combs," Science (80-.)., vol. 351, no. 6278, pp. 1176-1180, 2016.

R. Ramchander, "Quadrature-point stabilization of Mach-Zehnder interferometers," Thesis, 1990.

D. A. Jackson, R. Priest, A. Dandridge, A. B. Tveten, and B. A. Tveten, "Elimination of drift in a single-mode optical fiber interferometer using a piezoelctrically streched coiled fiber," Appl. Opt., vol. 19, no. 17, pp. 2926-2929, September 1980.

K. P. Koo, A. B. Tveten, and A. Dandridge, "Passive stabilization method for fiber interferometers using (3×3) fiber directional couplers," Appl. Phys. Lett., vol. 41, no. 7, pp. 616-618, 1982.

S.-B. Cho and T.-G. Noh, "Stabilization of a long-armed fiber-optic single-photon interferometer," Opt. Express, vol. 17, no. 21, p. 19027, October 2009.

P. Rortocki, "US 2018/0180401 A1," 2018.

G. Weihs, M. Reck, H. Weinfurter, and A. Zeilinger, "All-fiber three-path Mach-Zehnder interferometer.," Opt. Lett., vol. 21, no. 4, pp. 302-304, 1996.

Z. Zhao et al., "All-solid multi-core fiber-based multipath Mach-Zehnder interferometer for temperature sensing," Appl. Phys. B Lasers Opt., vol. 112, no. 4, pp. 491-497, 2013.

[P. Hariharan and D. Sen, "Three-beam interferometer," vol. 70, pp. 2-5, 1959.

N. Spagnolo et al., "Quantum interferometry with three-dimensional geometry," pp. 1-6, 2012.

K. LIU and R. M. MEASURES, "Signal Processing Methods for Software Radios," vol. 3, no. July, pp. 432-461, 2008.

A. Dandridge, A. B. Tveten, and T. G. Giallorenzi, "Homodyne Demodulation Method for Fiber Optic Sensors Using Phase Generated Carrier," IEEE Trans. Microw. Theory Tech., vol. 30, no. 10, pp. 1635-1641, October 1982.

[V. S. Sudarshanam and K. Srinivasan, "Linear readout of dynamic phase change in a fiber-optic homodyne interferometer," 1989.

Yu-Lung Lo and Chin-Ho Chuang, "New synthetic-heterodyne demodulator for an optical fiber interferometer," IEEE J. Quantum Electron., vol. 37, no. 5, pp. 658-663, May 2001.

[M. A. Choma, C. Yang, and J. A. Izatt, "Instantaneous quadrature low-coherence interferometry with 3×3 fiber-optic couplers," Opt. Lett., vol. 28, no. 22, p. 2162, November 2003.

R. Dändliker, R. Thalmann, and D. Prongué "Two-wavelength laser interferometry using superheterodyne detection," Opt. Lett., vol. 13, no. 5, p. 339, 1988.

D. H. Kim and B. J. Ahn, "Phase measurement and error analysis in the arc-tangent method using a novel phase-compensating algorithm," Meas. Sci. Technol., vol. 24, no. 10, 2013.

T. Ikuta and H. Takesue, "Implementation of quantum state tomography for time-bin qudits," New J. Phys., vol. 19, no. 1, p. 013039, January 2017.

M. Z-dotukowski, A. Zeilinger, and M. A. Home, "Realizable higher-dimensional two-particle entanglements via multiport beam splitters," Phys. Rev. A, vol. 55, no. 4, pp. 2564-2579, April 1997.

The invention claimed is:

1. A method for phase extraction of a multi-path interferometer, comprising:
   generating a reference signal of a coherence length longer than an arm length difference of the multi-path interferometer;
   splitting the reference signal into a frequency shifted reference signal and an unshifted reference signal, recombining the frequency shifted reference signal and the unshifted reference signal into a polarization- and frequency-multiplexed reference signal, and feeding the polarization- and frequency-multiplexed reference signal to the multi-path interferometer;
   detecting frequency shifted and unshifted output signals of the multi-path interferometer using at least one of: i) a polarization demultiplexer and a detector for each output of the multi-path interferometer; ii) a bucket detector detecting a sum of the frequency-shifted and unshifted output signals of the multi-path interferometer; iii) balanced detectors detecting a difference between the frequency-shifted and unshifted output signals of the multi-path interferometer; and iv) an array of photodiodes; and
   determining a proximity of a phase of the interferometer to a target phase by comparing the detected frequency-shifted and unshifted output signals of the multi-path interferometer with reference frequency shifted and unshifted interferometer output reference intensities, extracting a phase using intensity equations for multiple-path interferometers, comparing measured intensity values to the reference intensities, and assessing the proximity of the phase of the interferometer to the target phase from said comparison, and phase stabilization by offsetting a difference between the extracted phase and the target phase using a closed loop feedback.

2. The method of claim 1, wherein said detecting the frequency shifted and unshifted output signals of the multipath interferometer comprises detecting signals at each output of the multi-path interferometer.

3. The method of claim 1, further comprising delivering phase rectification signals.

4. The method of claim 1, further comprising tracking the phase of the multi-path interferometer.

5. The method of claim 1, wherein said splitting the reference signal into the frequency shifted reference signal and the unshifted reference signal uses at least one of: an acousto-optic modulator and an electro-optic modulator.

6. The method of claim 1, comprising using one of a continuous-wave source and a pulsed light source to generate the reference signal.

7. The method of claim 1, wherein the interferometer is one of balanced or unbalanced.

8. The method of claim 1, comprising using one of: continuous wave (CW) lasers, diodes, gas and solid state lasers, and bi-color beams generating lasers to generate the reference signal.

9. A system for phase extraction of a multi-path interferometer, comprising:
  a light source, said light source generating a coherence length longer than an arm length difference of the multi-path interferometer;
  a polarization multiplexing unit connected to the multi-path interferometer; and
  a detection unit, said detection unit comprising at least one of: i) a polarization demultiplexer and a detector for each output of the multi-path interferometer; ii) a bucket detector detecting a sum of the frequency-shifted and unshifted output signals of the multi-path interferometer; iii) balanced detectors; and iv) an array of photodiodes;
  wherein said polarization multiplexing unit comprises a beam splitter/coupler that splits a reference signal generated by said light source into a frequency shifted reference signal and an unshifted reference signal, and a polarization beam splitter that recombines said frequency shifted reference signal and said unshifted reference signal into a polarization- and frequency-multiplexed reference signal, and said polarization multiplexing unit feeds the polarization- and frequency-multiplexed reference signal to the multi-path interferometer; said detection unit detecting frequency-shifted and unshifted output signals of the multi-path interferometer, determining a proximity of a phase of the interferometer to a target phase by comparing the detected frequency-shifted and unshifted output signals of the multi-path interferometer with frequency shifted and unshifted interferometer output reference intensities, extracting a phase using intensity equations for multiple-path interferometers, comparing measured intensity values to the reference intensities, and assessing the proximity of the phase of the interferometer to the target phase from said comparison, and phase stabilization by offsetting a difference between the extracted phase and the target phase using a closed loop feedback.

10. The system of claim 9, wherein said detection unit detects signals at each output of the multi-path interferometer.

11. The system of claim 9, wherein said detection unit further compares the determined interferometer phase to a target phase and delivers phase rectification signals.

12. The system of claim 9, wherein said light source is one of: continuous wave (CW) lasers, diodes, gas and solid state lasers, and bi-color beams generating lasers.

13. The system of claim 9, wherein said polarization multiplexing unit comprises one of: acousto-optic modulators and electro-optic modulators.

14. The system of claim 9, wherein said the multi-path interferometer is one of: an unbalanced multi-path interferometer and a balanced multi-path interferometer.

* * * * *